United States Patent
Li

(10) Patent No.: US 11,149,160 B2
(45) Date of Patent: Oct. 19, 2021

(54) AQUEOUS INK-JET INKS CONTAINING TWO OR MORE BINDERS

(71) Applicant: E I DU PONT DE NEMOURS AND COMPANY, Wilmington, DE (US)

(72) Inventor: Xiaoqing Li, Newark, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 15/316,639

(22) PCT Filed: Oct. 23, 2014

(86) PCT No.: PCT/US2014/061887
§ 371 (c)(1),
(2) Date: Dec. 6, 2016

(87) PCT Pub. No.: WO2015/065796
PCT Pub. Date: May 7, 2015

(65) Prior Publication Data
US 2017/0190929 A1     Jul. 6, 2017

Related U.S. Application Data

(60) Provisional application No. 61/897,856, filed on Oct. 31, 2013.

(51) Int. Cl.
| | | |
|---|---|---|
| C09D 11/38 | (2014.01) | |
| C09D 11/322 | (2014.01) | |
| C09D 11/40 | (2014.01) | |
| C09D 11/102 | (2014.01) | |
| C09D 11/106 | (2014.01) | |
| C09D 11/30 | (2014.01) | |
| C09D 11/326 | (2014.01) | |
| B41M 5/00 | (2006.01) | |
| D06P 5/30 | (2006.01) | |

(52) U.S. Cl.
CPC ........... C09D 11/38 (2013.01); B41M 5/0047 (2013.01); C09D 11/102 (2013.01); C09D 11/106 (2013.01); C09D 11/30 (2013.01); C09D 11/322 (2013.01); C09D 11/326 (2013.01); C09D 11/40 (2013.01); D06P 5/30 (2013.01)

(58) Field of Classification Search
CPC ....... C09D 11/38; C09D 11/322; C09D 11/40; C09D 11/102; C09D 11/106; C09D 11/30; C09D 11/326; D06P 5/30; B41M 5/0047
See application file for complete search history.

(56) References Cited

U.S. PATENT DOCUMENTS

| | | | |
|---|---|---|---|
| 4,066,591 A * | 1/1978 | Scriven | C08G 18/0804 204/489 |
| 5,085,698 A | 2/1992 | Ma et al. | |
| 5,272,201 A | 12/1993 | Ma et al. | |
| 5,554,739 A | 9/1996 | Belmont | |
| 6,087,416 A | 7/2000 | Pearlstine et al. | |
| 6,794,425 B1 | 9/2004 | Ellis et al. | |
| 6,852,156 B2 | 2/2005 | Yeh et al. | |
| 7,449,501 B2 | 11/2008 | Uerz et al. | |
| 2003/0128246 A1 | 7/2003 | Redding et al. | |
| 2005/0182154 A1 | 8/2005 | Berge et al. | |
| 2005/0215663 A1 | 9/2005 | Berge et al. | |
| 2006/0100307 A1 | 5/2006 | Uerz et al. | |
| 2007/0056118 A1 * | 3/2007 | Ellis | C09D 11/322 8/115.51 |
| 2009/0281240 A1 | 11/2009 | Xiaoqing et al. | |
| 2010/0143589 A1 * | 6/2010 | Spinelli | C08G 18/0823 427/256 |
| 2012/0027736 A1 | 2/2012 | Morita et al. | |
| 2012/0214939 A1 | 8/2012 | Li et al. | |

FOREIGN PATENT DOCUMENTS

| | | |
|---|---|---|
| CN | 102167934 A | 8/2011 |
| CN | 102167935 A | 8/2011 |
| JP | 2007-522285 | 8/2007 |
| JP | 2009-149774 A | 7/2009 |
| JP | 2011-507994 | 3/2011 |
| JP | 2011-523428 | 8/2011 |
| JP | 2012-036287 A | 2/2012 |
| JP | 2012-214713 | 11/2012 |
| JP | 2013-194122 A | 9/2013 |
| WO | 2009/076386 A1 | 6/2009 |
| WO | 2009/137753 A1 | 11/2009 |
| WO | 2012/132305 A1 | 10/2012 |
| WO | 2013/096344 A1 | 6/2013 |
| WO | 2014/150019 A1 | 9/2014 |

OTHER PUBLICATIONS

Rogers, M. E., "Synthetic Methods in Step-Growth Polymers", pp. 197-263, Wiley Interscience, 2003 (book not included).*
Ionescu, M., "Chemistry and Technology of Polyols for Polyurethanes", p. 15, secton 2.3, Rapra Technology Limited, 2005 (book not included).*
International Search Report and Written Opinion dated Dec. 23, 2014 for International Application No. PCT/US2014/061887.

* cited by examiner

Primary Examiner — Patrick D Niland
(74) Attorney, Agent, or Firm — Simon L. Xu

(57) ABSTRACT

This disclosure relates to novel aqueous ink-jet inks having improved jetting properties containing an aqueous vehicle, a colorant, and a mixture of a dispersible crosslinked polyurethane binder and one or more soluble anionic polymeric binders.

11 Claims, No Drawings

AQUEOUS INK-JET INKS CONTAINING TWO OR MORE BINDERS

This application claims priority under 35 U.S.C. § 119 from U.S. Provisional Application No. 61/897,856, filed Oct. 31, 2013.

BACKGROUND OF THE DISCLOSURE

This disclosure relates to novel aqueous ink-jet inks having improved jetting properties containing an aqueous vehicle, a colorant, and a mixture of a dispersible crosslinked polyurethane binder and one or more water-soluble anionic polymeric binders.

Ink-jet digital printing method is becoming increasingly important for the printing of textiles. It offers a number of potential benefits over conventional printing methods such as screen printing. Digital printing eliminates the set-up expense associated with screen preparation and can potentially enable cost-effective short run production. Digital printing furthermore allows visual effects, such as tonal gradients and repeat of printed patterns that cannot be practically achieved with a screen printing process. Especially beneficial is the ease in changing the patterns of originals during production of digital printing, when it is possible to respond to a change in patterns or other requirements within a short period of time.

U.S. Pat. No. 6,794,425 discloses a pigment printing composition containing a hydrophobic polymer having a number average molecular weight of more than 40,000 and a hydrophilic polymer having a number average molecular weight of less than 30,000.

U.S. Patent Application Publication No. 20120277366 discloses an inkjet printing fluid having a water dispersible polyurethane additive and an acrylic latex polymer for higher optical density.

U.S. Pat. No. 7,449,501 discloses an inkjet composition containing an aqueous medium and microgel particles. The microgel particles contain a crosslinked copolymer prepared from a monomer mixture of at least a crosslinking monomer, a polymerizable carboxylic acid monomer, and one or more polymerizable water insoluble vinyl monomers.

A need exists for stable ink-jet inks with superior jetting properties that can be printed on various substrates to form durable, high quality image. The present disclosure satisfies this need by providing an ink containing a mixture of a dispersible crosslinked polyurethane binder and one or more water-soluble anionic polymeric binders.

SUMMARY OF THE DISCLOSURE

An embodiment of the present disclosure provides an ink-jet ink comprising an aqueous vehicle, a colorant, a first polymer and a second polymer; wherein said colorant is self-dispersed or dispersed by a dispersant, said first polymer is a crosslinked polyurethane and is dispersible in said aqueous vehicle, and said second polymer is an anionic polymer soluble in said aqueous vehicle and is one or more members selected from the group consisting of acrylic, polyurethane, hydrolyzed styrene maleic anhydride (SMA) and styrene acrylic acid polymer (SA), and wherein said first polymer and said second polymer are different from said dispersant.

Another embodiment provides that the colorant is dispersed by a dispersant.

Another embodiment provides that the second polymer is polyurethane.

Another embodiment provides that the dispersant is crosslinked.

Another embodiment provides that the ink is printed on an offset media.

Another embodiment provides that the ink is printed on textile.

Another embodiment provides that the second polymer is acrylic.

Another embodiment provides that the colorant is self-dispersed.

Yet another embodiment provides an ink-jet ink consisting of an aqueous vehicle, a colorant, a first polymer and a second polymer; wherein said colorant is self-dispersed or dispersed by a dispersant, said first polymer is a crosslinked polyurethane and is dispersible in said aqueous vehicle, and said second polymer is an anionic polymer soluble in said aqueous vehicle and is one or more members selected from the group consisting of acrylic, polyurethane, hydrolyzed styrene maleic anhydride (SMA) and styrene acrylic acid polymer (SA), and wherein said first polymer and said second polymer are different from said dispersant.

These and other features and advantages of the present embodiments will be more readily understood by those of ordinary skill in the art from a reading of the following Detailed Description. Certain features of the disclosed embodiments which are, for clarity, described above and below as a separate embodiment, may also be provided in combination in a single embodiment. Conversely, various features of the disclosed embodiments that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this disclosure pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples encompassed by the terms "consisting essentially of" and "consisting of." Similarly, the term "consisting essentially of" is intended to include examples encompassed by the term "consisting of."

As used herein, the term "dispersion" means a two phase system where one phase consists of finely divided particles (often in the colloidal size range) distributed throughout a bulk substance, of the particles being the dispersed or internal phase and the bulk substance being the continuous or external phase.

As used herein, the term "dispersant" means a surface active agent added to a suspending medium to promote uniform and maximum separation of extremely fine solid particles often of colloidal size. For pigments, dispersants are most often polymeric dispersants. The polyurethane dispersants described herein are in fact dispersions themselves.

As used herein, the term "OD" means optical density.

As used herein, the term "aqueous vehicle" refers to water or a mixture of water and at least one water-soluble, or partially water-soluble (i.e. methyl ethyl ketone), organic solvent (co-solvent).

As used herein, the tem "ionizable groups," means potentially ionic groups.

As used herein, the term "substantially" means being of considerable degree, almost all.

As used herein, the term "MW" means weight average molecular weight.

As used herein, the term "D50" means the volume particle diameter of the 50th percentile (median) of the distribution of particle sizes.

As used herein, the term 'D95' means the volume particle diameter of the 95th percentile of the distribution of particle sizes.

As used herein, the term 'NCO' means isocyanate.

As used herein, the term "cPs" means centipoise, a viscosity unit.

As used herein, the term "mN·m$^{-1}$" means milliNewtons per meter, a surface tension unit.

As used herein, the term "mPa·s" means millipascal second, a viscosity unit.

As used herein, the term "psig" means pounds square inch gauge, a pressure unit that does not include air pressure.

As used herein, the term "prepolymer" means the polymer that is an intermediate in a polymerization process, and can be considered a polymer.

As used herein, the term "AN" means acid number, mg KOH/gram of solid polymer.

As used herein, the term "PUD" means the polyurethanes dispersions described herein.

As used herein, the term "DTG" means direct to garment.

As used herein, the term "BMEA" means bis(methoxyethyl)amine.

As used herein, the term "DBTDL" means dibutyltin dilaurate.

As used herein, the term "DMPA" means dimethylol propionic acid.

As used herein, the term "IPDI" means isophorone diisocyanate.

As used herein, the term "NMP" means n-Methyl pyrolidone.

As used herein, the term "TEB" means triethylene glycol monobutyl ether, a reagent supplied by Dow Chemical.

As used herein, the term "Sulfolane" means tetramethylene sulfone.

As used herein, Terathane® 650 is a polyether diol from Invista, Wichita, Kans.

As used herein, the term "EDA" means ethylene diamine.

As used herein, the term "TEA" means triethylamine.

As used herein, the term "DEA" means diethanolamine.

As used herein, the term "DMPA" means dimethylol propionic acid.

As used herein, the term "Tetraglyme" means tetraethylene glycol dimethyl ether.

As used herein, the term "BzMA" means benzyl metharylate.

As used herein, the term "MAA" means Methyl acylic acid.

As used herein, the term "TETA" means triethylenetetramine.

As used herein, the term "THF" means tetrahydrofuran.

As used herein, Desmophen XP2501 is a polyester carbonate diol from Bayer (Pittsburgh, Pa.).

As used herein, Surfynol® 440 is a nonionic surfactant from Air Products (Allentown, Pa.).

As used herein, Terathane® 1000 is a polytetramethylene oxide polyol from Invista (Wichita, Kans.).

As used herein, PCDL T6002 is a polycarbonate diol from Asahi Kasai (Tokyo, Japan).

Unless otherwise noted, the above chemicals were obtained from Aldrich (Milwaukee, Wis.) or other similar suppliers of laboratory chemicals.

In addition, references in the singular may also include the plural (for example, "a" and "an" may refer to one, or one or more) unless the context specifically states otherwise.

Binder

A binder is a polymeric compound or a mixture of polymeric compounds that is added to the ink formulation. The binder can impart properties to the final printed material that, for example, gives greater durability to the printed material. Typical polymers used as binders in ink-jet inks include polyurethane dispersions and polyurethane solutions, acrylics, styrene acrylics, styrene butadienes, styrene butadiene acrylonitriles, neoprenes, ethylene acrylic acids, ethylene vinyl acetate emulsions, latexes and the like. The binder may be a solution or stabilized as an emulsion by having ionic substituents such as carboxylic acids, sulfur containing acids, amine groups, and other similar ionic groups, and/or non-ionic hydrophilic substituents such as —(CH$_2$CH$_2$O)$_n$—, where n is an integer from 1 to 20.

Crosslinked Dispersible Polyurethane Binder

A cross-linked polyurethane refers to a polyurethane containing cross-linkable moieties that are cross-linked with a cross-linking agent, and these terms are understood by persons of ordinary skill in the art.

The cross-linked polyurethane binder is not soluble in an ink's aqueous vehicle, but may be stabilized in the aqueous vehicle by having ionic substituents such as carboxylic acids, sulfur containing acids, and other similar ionic groups. More typically, the polyurethanes can be stabilized in the dispersion through incorporation of anionic functionalities, such as neutralized acid groups.

Suitable cross-linked polyurethanes are typically prepared by multi-step synthetic processes in which an NCO terminated prepolymer is formed. This prepolymer is added to water, or water is added to the prepolymer, to form a polymer dispersed in water (aqueous dispersion) that can subsequently undergoes chain extension reactions in the aqueous phase. The prepolymer can also be formed by a single-step process. Chain extension reactions can also be a single or multi-step process. Cross-linking can take place at any part during the single- or multi-step process.

Typically, cross-linking of the polyurethane binder is substantially completed prior to its addition to the ink formulation. Other applications of polyurethanes in an ink-jet system may require that there is a component in the polyurethanes that can undergo cross-linking at the time of ink formulation, or more likely at the time of printing, or post treatment of the printed material. Alternatively, a cross-linking species can be added to affect the cross-linking at ink formulation time or later. Each of these processes can be described as a post-cross-linking system.

A stable aqueous dispersion of cross-linked polyurethane particles suitable for use as a binder additive has a dry polymer content of up to about 60% by weight, typically from about 15 to about 60% by weight, and more typically from about 30 to about 40% by weight, based on the total dispersion weight. However, it is always possible to dilute the dispersions to a concentration with any minimum solids content desired.

The means to achieve cross-linking of the polyurethane generally rely on at least one component of the polyurethane (starting material and/or intermediate) having three or more functional reaction sites. Reaction of these reaction sites produces a cross-linked polyurethane. When only two reactive sites are available on each reactive components, only linear (albeit possibly high molecular weight) polyurethanes are produced. Examples of cross-linking techniques include, but are not limited to, the following:

(a) the isocyanate-reactive moiety has at least three reactive groups, such as polyfunctional amines or polyol;
(b) the isocyanate has at least three isocyanate groups;
(c) the prepolymer chain has at least three reactive sites that can react via reactions other than the isocyanate reaction, for example with amino trialkoxysilanes;
(d) addition of a reactive component with at least three reactive sites to the polyurethane prior to its use in the ink-jet ink preparations, for example tri-functional epoxy cross-linkers;
(e) addition of a water-dispersible cross-linker with oxazoline functionality;
(f) synthesis of a polyurethane with carbonyl functionality, followed by addition of a dihydrazide compound; and
(g) any combination of the above cross-linking methods (a) through (f) and other cross-linking means known to those of ordinary skill in the relevant art.

The amount of cross-linking of the polyurethane to achieve the desired properties can vary over a broad range. While not being bound to theory, the amount of cross-linking is a function of the polyurethane composition, the whole sequence of reaction conditions utilized to form the polyurethane and other factors known to those of ordinary skill in the art. The extent of cross-linking, ink-jet ink formulation, colorant, other inks in the ink-jet set, printing media/substrate, post treatment exposure to heat and/or pressure, and printing technique, all contribute to the performance or quality of the final printed articles. Printing technique can include pre- and post-treatment of printed articles.

Based on techniques described herein, a person having ordinary skill in the art is able to determine, via routine experimentation, the cross-linking needed for a particularly type of polyurethane to obtain an effective ink-jet ink for textiles.

The amount of cross-linking can be measured by a standard Tetrahydrofuran (THF) Insolubles test. To obtain the percent of THF Insolubles of a polyurethane, 1 gram of the polyurethane dispersion is mixed with 30 grams of THF in a pre-weighed centrifuge tube. The solution is centrifuged for 2 hours at 17,000 rpm before the top liquid layer is poured out leaving behind a non-dissolved gel at the bottom. The centrifuge tube with the non-dissolved gel is re-weighed, after the tube is dried in an oven for 2 hours at 110° C. The percent of THF insolubles of the polyurethane is calculated using the equation below:

$$\% \, THF \, \text{Insolubles} = \frac{\text{Weight of Tube and Non Dissolved Gel} - \text{Weight of Tube}}{\text{Sample Weight} * \text{Polyurethane Solid \%}} * 100$$

The higher the percent of THF Insolubles of a polyurethane, the higher the amount of cross-linking of the polyurethane.

The upper limit of cross-linking of a polyurethane is related to the ability of the polyurethane to form a stable aqueous dispersion. As long as a cross-linked polyurethane has adequate ionic functionality to make it stable when inverted into water, the corresponding level of cross-linking is deemed acceptable and will lead to an improved ink-jet ink for textiles. The emulsion/dispersion stability of the cross-linked polyurethane can also be improved by adding dispersants or emulsifiers. The upper limit of cross-linking as measured by the THF Insolubles test is about 90%, although more typically the upper limit is about 60%.

The lower limit of cross-linking of a polyurethane is about 1% or greater, typically about 4% or greater, and more typically about 10% or greater, as measured by the THF Insolubles test.

Combinations of two or more cross-linked polyurethanes (either combined into a single binder additive, or as separate binder additives) may also be utilized in the formulation of an ink.

Further details about cross-linking of polyurethane binders and their use in aqueous ink-jet inks can be found in U.S. Patent Application Publication No. 20050182154.

Water-Soluble Anionic Polymeric Binders

Suitable water-soluble anionic polymeric binders for the present disclosure include acrylic, polyurethane, hydrolyzed styrene maleic anhydride (SMA) and styrene acrylic acid polymer (SA). It has been found that proper mixing of the crosslinked polyurethane binder described above with one or more of these water-soluble anionic polymeric binder can alleviate the rapid drying problem caused by having the crosslinked anionic polyurethane binder alone and improve jetting reliability.

Mixing of Binders

The total amount of binders is typically present in an ink in an amount of at least 0.2% by weight based on the total weight of the ink. Typically, the ratio of the crosslinked anionic polyurethane binder to the water-soluble anionic polymeric binder is between 1:0.05 and 0.05:1 by weight. More typically, the ratio of the crosslinked anionic polyurethane binder to the water-soluble anionic polymeric binder is between 1:0.1 and 0.1:1 by weight.

Colorants

A wide variety of organic and inorganic pigments, alone or in combination, may be dispersed with a polymeric dispersant to prepare an ink, especially an ink-jet ink. The term "pigment" as used herein means an insoluble colorant that requires to be dispersed with a dispersant and processed under dispersive conditions in the presence of a dispersant. The colorant also includes dispersed dyes. The dispersion process results in a stable dispersed pigment. The pigment particles are sufficiently small to permit free flow of the ink through the ink-jet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is typically about 0.005 micron to about 15 micron. Typically, the pigment particle size should range from about 0.005 to about 5 micron and, most typically, from about 0.005 to about 1 micron. The average particle size as measured by dynamic light scattering is less than about 500 nm, typically less than about 300 nm.

The selected pigment(s) may be used in dry or wet form. For example, pigments are usually manufactured in aqueous media, and the resulting pigments are obtained as a water-wet presscake. In presscake form, the pigment does not agglomerate to the extent like it is in dry form. Thus, pigments in water-wet presscake form do not require as much mixing energy to de-agglomerate in the premix process as pigments in dry form. Representative commercial dry pigments are listed in U.S. Pat. No. 5,085,698.

Some examples of pigments with coloristic properties useful in ink-jet inks include: cyan pigments from Pigment Blue 15:3 and Pigment Blue 15:4; magenta pigments from Pigment Red 122 and Pigment Red 202; yellow pigments from Pigment Yellow 14, Pigment Yellow 95, Pigment Yellow 110, Pigment Yellow 114, Pigment Yellow 128 and Pigment Yellow 155; red pigments from Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264; green pigments from Pigment Green 1, Pigment Green 2, Pigment Green 7 and Pigment Green 36; blue pigments from Pigment Blue 60, Pigment Violet 3, Pigment Violet 19, Pigment Violet 23, Pigment Violet 32, Pigment Violet 36 and Pigment Violet 38; white pigments such as $TiO_2$ and ZnO; and black pigment carbon black. The pigment names and abbreviations used herein are the "C.I." designation for pigments established by Society of Dyers and Colourists, Bradford, Yorkshire, UK and published in *The Color Index*, Third Edition, 1971.

The pigment of the present disclosure can also be a self-dispersing (or self-dispersible) pigment. The term self-dispersing pigment (or "SDP") refers to pigment particles whose surface has been chemically modified with hydrophilic, dispersability-imparting groups that allow the pigment to be stably dispersed in an aqueous vehicle without a separate dispersant. "Stably dispersed" means that the pigment is finely divided, uniformly distributed and resistant to particle growth and flocculation.

The SDPs may be prepared by grafting a functional group or a molecule containing a functional group onto the surface of the pigment, by physical treatment (such as vacuum plasma), or by chemical treatment (for example, oxidation with ozone, hypochlorous acid or the like). A single type or a plurality of types of hydrophilic functional groups may be bonded to one pigment particle. The hydrophilic groups are carboxylate or sulfonate groups which provide the SDP with a negative charge when dispersed in aqueous vehicle. The carboxylate or sulfonate groups are usually associated with monovalent and/or divalent cationic counter-ions. Methods of making SDPs are well known and can be found, for example, in U.S. Pat. Nos. 5,554,739 and 6,852,156.

The SDPs may be black, such as those based on carbon black, or may be colored pigments. Examples of pigments with coloristic properties useful in ink-jet inks include: Pigment Blue 15:3 and Pigment Blue 15:4 (for cyan); Pigment Red 122 and Pigment Red 202 (for magenta); Pigment Yellow 14, Pigment Yellow 74, Pigment Yellow 95, Pigment Yellow 110, Pigment Yellow 114, Pigment Yellow 128 and Pigment Yellow 155 (for yellow); Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264 (for red); Pigment Green 1, Pigment Green 2, Pigment Green 7 and Pigment Green 36264 (for green); Pigment Blue 60, Pigment Violet 3, Pigment Violet 19, Pigment Violet 23, Pigment Violet 32, Pigment Violet 36 and Pigment Violet 38 (for blue); and carbon black. However, some of these pigments may not be suitable for preparation as SDP. Colorants are referred to herein by their "CI" designations established by Society Dyers and Colourists, Bradford, Yorkshire, UK and published in *The Color Index*, Third Edition, 1971.

The SDPs of the present disclosure may have a degree of functionalization wherein the density of anionic groups is less than about 3.5 μmoles per square meter of pigment surface (3.5 $\mu mol/m^2$), and more specifically, less than about 3.0 $\mu mol/m^2$. Degrees of functionalization of less than about 1.8 $\mu mol/m^2$, and more specifically, less than about 1.5 $\mu mol/m^2$, are also suitable and may be preferred for certain specific types of SDPs.

The range of useful particle size after dispersion is typically from about 0.005 um to about 15 um. Typically, the pigment particle size should range from about 0.005 um to about 5 um; and, specifically, from about 0.005 um to about 1 um. The average particle size as measured by dynamic light scattering is less than about 500 nm, typically less than about 300 nm.

The amount of pigment present in the ink is typically in the range of from about 0.1% to about 25% by weight, and more typically in the range of from about 0.5% to about 10% by weight, based on the total weight of ink. If an inorganic pigment is selected, the ink will tend to contain higher percentages by weight of pigment than with comparable inks employing organic pigment, since inorganic pigments generally have higher densities than organic pigments.

Polymeric Dispersant

A typical polymeric dispersant is a polyurethane polymer. Polyurethane polymers are, for the purposes of the present disclosure, polymers wherein the polymer backbone contains urethane linkage derived from the reaction of an isocyanate group (from, e.g., a di- or higher-functional monomeric, oligomeric or polymeric polyisocyanate) with a hydroxyl group (from, e.g., a di- or higher-functional monomeric, oligomeric or polymeric polyol). Such polymers may, in addition to the urethane linkage, also contain other isocyanate-derived linkages such as urea, as well as other types of linkages present in the polyisocyanate components or polyol components (such as, for example, ester and ether linkage).

The polyurethane dispersant can also be cross-linked as disclosed in U.S. Patent Application Publication No. 2012/0214939, which is incorporated by reference herein for all purposes as if fully set forth.

Ink Vehicle

The ink of the present disclosure comprises an ink vehicle, typically an aqueous ink vehicle, also known as aqueous vehicle or aqueous carrier medium.

The ink vehicle is the liquid carrier (or medium) for the aqueous dispersion(s) and optional additives. The term "aqueous ink vehicle" refers to an ink vehicle comprised of water or a mixture of water and one or more organic, water-soluble vehicle components commonly referred to as co-solvents or humectants. Selection of a suitable mixture depends on requirements of the specific application, such as desired surface tension and viscosity, the selected pigment, drying time of the pigmented ink jet ink, and the type of paper onto which the ink will be printed. Sometimes in the art, when a co-solvent can assist in the penetration and drying of an ink on a printed substrate, it is referred to as a penetrant.

Examples of water-soluble organic solvents and humectants include: alcohols, ketones, keto-alcohols, ethers and others, such as thiodiglycol, sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

A mixture of water and a polyhydric alcohol, such as diethylene glycol, is typical as the aqueous ink vehicle. In the case of a mixture of water and diethylene glycol, the ink vehicle usually contains from 30% water and 70% diethylene glycol to 95% water and 5% diethylene glycol, more typically from 60% water and 40% diethylene glycol to 95% water and 5% diethylene glycol. Percentages are based on the total weight of the ink vehicle. A mixture of water and butyl carbitol is also an effective ink vehicle.

The amount of ink vehicle in the ink is typically in the range of from 70% to 99.8%, and more typically from 80% to 99.8%, by weight based on total weight of the ink.

The ink vehicle can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. Typical 1,2-alkanediols are $C_4$-$C_6$ alkanediols with 1,2-hexanediol being most typical. Suitable surfactants include ethoxylated acetylene diols (e.g., Surfynol® series commercially available from Air Products), ethoxylated alkyl primary alcohols (e.g., Neodol® series commercially available from Shell) and secondary alcohols (e.g., Tergitol® series commercially available from Union Carbide), sulfosuccinates (e.g., Aerosol® series commercially available from Cytec), organosilicones (e.g., Silwet® series commercially available from Witco) and fluoro surfactants (e.g., Zonyl® series commercially available from DuPont).

The amount of glycol ether(s) and 1,2-alkanediol(s) added is typically in the range of from 1% to 15%, and more typically from 2% to 10% by weight, based on the total weight of the ink. Surfactants may be used, typically in the amount of from 0.01% to 5% and more typically from 0.2% to 2%, by weight based on the total weight of the ink.

Although not restricted to any particular viscosity range or printhead, the inks of the disclosure are particularly suited to lower viscosity applications. Thus the viscosity (at 25° C.) of the inks of this disclosure may be less than about 7 mPa·s, or less than about 5 mPa·s, and even more advantageously, less than about 3.5 mPa·s.

Other Ingredients

Other ingredients, additives, may be formulated into the ink-jet ink, to the extent that such other ingredients do not interfere with the stability and jettability of the ink-jet ink. This may be readily determined by routine experimentation by one skilled in the art.

Surfactants are commonly added to inks to adjust surface tension and wetting properties. Suitable surfactants include the ones disclosed in the Vehicle section above. Surfactants are typically used in amounts up to about 5% and more typically in amounts up to 2% by weight, based on the total weight of the ink.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), diethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

The ink-jet ink may contain other ingredients as are well known in the art. For example, anionic, non-ionic, cationic or amphoteric surfactants may be used. In aqueous inks, the surfactants are typically present in the amount of about 0.01 to about 5%, and preferably about 0.2 to about 2%, based on the total weight of the ink.

Co-solvents, such as those exemplified in U.S. Pat. No. 5,272,201 (incorporated by reference herein for all purposes as if fully set forth) may be included to improve pluggage inhibition properties of the ink composition.

Certain reagents can be used as additives to an ink-jet ink to effect post printing curing. Post printing curing is often facilitated by heating of the sample after it is printed. Example of suitable post printing curing agents include amide and amine-formaldehyde resin, phenolic resins, urea resins and blocked polyisocyanate. The selected post printing curing agent should be soluble or dispersible in an ink. Inks containing a mixture of the anionic and non-ionic binders and the selected post printing curing agents are stable in storage, which means no curing reaction took place before printing. Only after the ink is printed and when the printed image is fused with heat and optionally pressure, that the post printing curing agent undergoes chemical reaction with the one or more of the binders, dispersant, ink vehicle, substrate, etc. A specific example of post printing curing agent is Cymel® 303 ULF, from Cytec, West Patterson, N.J.

Biocides may be used to inhibit growth of microorganisms.

Ink Properties

Jet velocity, separation length of the droplets, drop size and stream stability are greatly affected by the surface tension and the viscosity of the ink. Pigmented ink jet inks typically have a surface tension in the range of about 20 dyne/cm to about 70 dyne/cm at 25° C. Viscosity can be as high as 30 cP at 25° C., but is typically somewhat lower. The ink has physical properties compatible with a wide range of ejecting conditions, i.e., driving frequency of the piezo element or ejection conditions for a thermal head for either a drop-on-demand device or a continuous device, and the shape and size of the nozzle. The inks should have excellent storage stability for long periods so as not to clog to a significant extent in an ink jet apparatus. Furthermore, the ink should not corrode parts of the ink jet printing device it comes in contact with, and it should be essentially odorless and non-toxic.

Ink Sets

The term "ink set" refers to all the individual inks or other fluids an ink-jet printer is equipped to jet. Ink sets typically comprise at least three differently colored inks. For example, a cyan (C), magenta (M) and yellow (Y) ink forms a CMY ink set. More typically, an ink set includes at least four differently colored inks, for example, by adding a black (K) ink to the CMY ink set to form a CMYK ink set. The magenta, yellow and cyan inks of the ink set are typically aqueous inks, and may contain dyes, pigments or combinations thereof as the colorant. Such other inks are, in a general sense, well known to those of ordinary skill in the art.

In addition to the typical CMYK inks, an ink set may further comprise one or more "gamut-expanding" inks, including differently colored inks such as an orange ink, a green ink, a red ink and/or a blue ink, and combinations of full strength and light strength inks such as light cyan and light magenta. These "gamut-expanding" inks are particularly useful in textile printing for simulating the color gamut of analog screen printing, such as disclosed in U.S. Patent Application Publication No. 20030128246.

The inks and ink sets can be used to print on many substrates including paper, especially coated papers, packaging materials, textiles and polymer substrates.

A particularly advantageous use of the inks and ink sets of the present disclosure is in the ink-jet printing of textiles. Textiles include, but are not limited to, cotton, wool, silk, nylon, polyester and the like, and blends thereof. The finished form of the textile includes, but is not limited to, fabrics, garments, t-shirts, furnishings such as carpets and upholstery fabrics, and the like. Additionally, fibrous textile materials that come into consideration are especially hydroxyl-group-containing fibrous materials, including natural fibrous materials such as cotton, linen and hemp, and regenerated fibrous materials such as viscose and lyocell. Further fibrous materials include wool, silk, polyvinyl, polyacrylonitrile, polyamide, aramide, polypropylene and polyurethane. These fibrous materials are typically in the form of sheet-form textile woven fabrics, knitted fabrics or webs.

Another particularly advantageous use of the inks and ink sets of the present disclosure is in the ink-jet printing of commercial coated offset media. Commercial offset paper typically contains a nonporous smooth surface. The smooth non-porous surface is formed by a coating which requires more time for fluids to penetrate. In many instances, offset coatings contain polymers that are more hydrophobic, e.g., styrene-butadiene based, than paper coatings specifically designed for ink-jet ink, e.g., water-soluble polymers such as polyvinyl alcohol. Thus, because offset coatings are typically hydrophobic, have poor penetration properties, and are smooth/non-porous, offset coatings tend to interact poorly with water-based inks. Examples of polymers used to coat offset media include latex binders, polystyrenes, polyolefins (polypropylene, polyethylene, polybutadiene), polyesters (PET), polyacrylates, polymethacrylates, and/or poly (maleic anhydride).

The following examples illustrate the present disclosure without, however, being limited thereto.

EXAMPLES

Solid Content Measurement

Solid content for the solvent free polyurethane dispersions was measured with a moisture analyzer, Model MA50 from Sartorius. For polyurethane dispersions containing a high boiling solvent, such as NMP, tetraethylene glycol dimethyl ether, or sulfolane, the solid content was determined by the weight difference before and after baking in an oven set at 150° C. oven for 180 min.

Preparation of First Polymer: An Anionic Crosslinked Polyurethane Binder

The First Polymer (PUD Binder) was prepared according to the same procedure disclosed in U.S. Patent Application Publication No. 2005/0215663 (incorporated by reference herein for all purposes as if fully set forth) under "Polyurethane Dispersoid (PUD EX 1)".

Preparation of Second Polymer: Water-Soluble Anionic Polymeric Non-Crosslinked Binders Acrylic Polymer 1

Acrylic polymer 1 is a block copolymer consisting of benzyl metharylate//methacrylic acid (BzMA/MAA, mole ratio 39/30). It was prepared using a method similar to the one disclosed in U.S. Pat. No. 6,087,416 (incorporated by reference herein for all purposes as if fully set forth) under "Preparation of Dispersant Polymer 1", with the ratio of monomers adjusted to 39//30 instead of the 13//10 ratio indicated in the '416 patent.

Polyurethane 1 (XP2501/DEA)

To a dry, alkali- and acid-free flask, equipped with an addition funnel, a condenser, a stirrer and a nitrogen gas line were added 140 g of Desmophen XP2501, a 1000 MW polyester carbonate diol (Bayer), 47 g of DMPA, 31.6 g of TEA, 98 g of acetone and 0.06 g of DBTDL. The contents were heated to 40° C. and thoroughly mixed. To the flask was added 136 g of IPDI via the addition funnel at 40° C. over a period of 60 min, with any residual IPDI being rinsed from the addition funnel into the flask with 10 g of acetone.

The flask temperature was raised to 50° C., and was held at 50° C. until NCO % reached 2.3%% or less. To the flask was added 24.3 g of DEA over a period of 5 minutes followed by rinsing the additional funnel with 5 g of acetone. After 1 hour at 50° C., 600 g of deionized (DI) water was added over 10 min via the addition funnel. The mixture was held at 50° C. for 1 hr, then cooled to room temperature.

Acetone (~113 g) was removed under vacuum, leaving a polyurethane solution with about 35.0% solids by weight.

Polyurethane 2 (XP2501/KOH)

To a dry, alkali- and acid-free flask, equipped with an addition funnel, a condenser, a stirrer and a nitrogen gas line were added 120 g of Desmophen XP2501, a 1000 MW polyester carbonate diol (Bayer), 36 g of DMPA and 98 g of Tetraglyme. The contents were heated to 60° C. and thoroughly mixed. To the flask was added 95 g of IPDI via the addition funnel at 60° C. over a period of 60 min, with any residual IPDI being rinsed from the addition funnel into the flask with 10 g of Tetraglyme.

The flask temperature was raised to 80° C., and was held for 120 min until NCO % reached 0.92% or less, then 10.5 gram BMEA was added over 5 min.

With the temperature at 80° C., a mixture of 31.8 g 45% KOH solution and 540 g of deionized (DI) water was added over 10 min via the addition funnel, which was then rinsed with 30.0 g of water. The mixture was held at 50° C. for 1 hr, then cooled to room temperature. The final polyurethane solution solids was 27%.

Polyurethane 3 (PCDL/Terathane 75/25, 50AN)

To a dry, alkali- and acid-free flask, equipped with an addition funnel, a condenser, a stirrer and a nitrogen gas line were added 215 g of PCDL T6002, a 2000 MW polycarbonate diol (Asahi Kasai), 40 g of Terathane 1000, a 1000 MW polyether diol (Invista), 70 g of DMPA and 316 g of Tetraglyme. The contents were heated to 60° C. and thoroughly mixed. To the flask was added 164 g of IPDI via the addition funnel at 60° C. over a period of 60 min, with any residual IPDI being rinsed from the addition funnel into the flask with 10 g of Tetraglyme.

The flask temperature was raised to 80° C., and was held for 120 min until NCO % reached 0.70% or less, then 18 gram BMEA was added over 5 min.

With the temperature at 80° C., a mixture of 61.8 g of 45% KOH solution and 1020 g of deionized (DI) water was added over 10 min via the addition funnel, which was then rinsed with 30.0 g of water. The mixture was held at 50° C. for 1 hr, then cooled to room temperature. The final polyurethane solution's solid % was 26.4%

Polyurethane 4 (PCDL/Terathane 75/25, 60AN)

To a dry, alkali- and acid-free flask, equipped with an addition funnel, a condenser, stirrer and a nitrogen gas line were added 215 g of PCDL T6002, a 2000 MW polycarbonate diol (Asahi Kasai), 40 g of Terathane 1000, a 1000 MW polyether diol (Invista), 56 g of DMPA and 316 g of Tetraglyme. The contents were heated to 60° C. and thoroughly mixed. To the flask was added 151 g of IPDI via the addition funnel at 60° C. over a period of 60 min, with any residual IPDI being rinsed from the addition funnel into the flask with 10 g of Tetraglyme.

The flask temperature was raised to 80° C., and held for 120 min until NCO % reached 1.25% or less, then 30 g of BMEA was added over 5 min.

With the temperature at 80° C., a mixture of 49.4 g of 45% KOH solution and 809 g of deionized (DI) water was added over 10 min via the addition funnel, which was then rinsed with 30.0 g of water. The mixture was held at 50° C. for 1 hr, then cooled to room temperature. The final polyurethane solution's solid % was 24%.

Polyurethane 5 (PCDL/Terathane 50/50, 50AN)

To a dry, alkali- and acid-free flask, equipped with an addition funnel, a condenser, a stirrer and a nitrogen gas line were added 148 g of PCDL T6002, a 2000 MW polycarbonate diol (Asahi Kasai), 74 g of Terathane 1000, a 1000 MW polyether diol (Invista), 48 g of DMPA and 260 g of Tetraglyme. The contents were heated to 60° C. and thoroughly mixed. To the flask was added 135 g of IPDI via the addition funnel at 60° C. over a period of 60 min, with any residual IPDI being rinsed from the addition funnel into the flask with 10 g of Tetraglyme.

The flask temperature was raised to 80° C., and held for 120 min until NCO % reached 1.27% or less, then 27 g of BMEA was added over 5 min.

With the temperature at 80° C., a mixture of 19 g of 45% KOH solution and 714 g of deionized (DI) water was added over 10 min via the addition funnel, which was then rinsed with 30.0 g of water. The mixture was held at 50° C. for 1 hr, then cooled to room temperature. The final polyurethane solution's solid % was 29%.

Preparation of Pigment Dispersions

A black dispersion (Polymeric Dispersed K) containing a black pigment dispersed by a polymeric dispersant was prepared according to a procedure disclosed in U.S. Patent Application Publication No. 2005/0215663, which is incorporated by reference herein for all purposes as if fully set forth.

A self-dispersed black pigment dispersion ($Li^+$ SDP Dispersion) neutralized by LiOH was prepared by oxidizing carbon black (Nipex 160 from Evonik) according to the ozone oxidation procedures disclosed in U.S. Pat. No. 6,852,156 and using LiOH to neutralize the treated pigment.

Preparation of Inks

Inks used in the examples were made according to standard procedures in the ink-jet art. Ingredient amounts are weight percent based on the weight of the final ink. Polyurethane binders and colorants are quoted on a solids basis.

Printing and Testing

Inks were printed with Seiko IP-4010 printer configured to accept fabrics. Jetting reliability was assessed on a scale of 1 to 3, with a rating 1 of being the best, a rating of 2 being fair and a rating of 3 being poor. For ink compositions to be of practical use, they should have a jetting reliability rating of at least 2.

The fabrics used were obtained from Testfabrics, Inc, (Pittston, Pa.) namely: 100% cotton fabric style #419W, which is a bleached, mercerized combed broadcloth (133× 72). In some examples, the printed textile was fused at elevated temperature and pressure with a platen press. The platen press was comprised of two parallel 6" square platens with embedded resistive heating elements that could be set to maintain a desired platen temperature. The platens were fixed in a mutually parallel position to a pneumatic press that could press the platens together at a desired pressure by means of adjustable air pressure. Care was taken to be sure the platens were aligned so as to apply equal pressure across the entire work piece being fused. The effective area of the platen could be reduced, as needed, by inserting a spacer (made, for example from silicone rubber) of appropriate dimensions to allow operation on smaller work pieces.

The standard temperature for the fusing step in the examples was 190° C. and dwell time was 1 minute unless otherwise indicated.

The printed textiles were tested according to methods developed by the American Association of Textile Chemists and Colorists, (AATCC), Research Triangle Park, N.C. The AATCC Test Method 61-1996, "Colorfastness to Laundering, Home and Commercial: Accelerated", was used. In that test, colorfastness is described as "the resistance of a material to change in any of its color characteristics, to transfer of its colorant(s) to adjacent materials or both as a result of the exposure of the material to any environment that might be encountered during the processing, testing, storage or use of the material." The ratings for these tests are from 1-5 with 5 being the best result, that is, little or no loss of color.

Colorfastness to crocking was also determined by AATCC Crockmeter Method, AATCC Test Method 8-1996. The ratings for these tests were from 1-5 with 5 being the best result, that is, little or no loss of color and little or no transfer of color to another material, respectively. The results were rounded to the nearest 0.5, which was judged to be accurate for this method.

Inks 1A-1C were prepared using the LiOH neutralized self-dispersing black pigment dispersion, PUD Binder as the first binder, and an acrylic polymer or a polyurethane as the second binder, and other ingredients listed in Table 1 below. The inks were printed on 419 cotton fabric, fused at 190° C. for 1 min. The jetting reliability rating, washfastness and crock properties for Inks 1A-1C are also listed in Table 1.

TABLE 1

|  | Ink 1A (Comparative) | Ink 1B | Ink 1C |
|---|---|---|---|
| $Li^+$ SDP Dispersion | 6% | 6% | 6% |
| Acrylic polymer 1 |  | 3% |  |
| Polyurethane 1 |  |  | 3% |
| PUD Binder | 9% | 7% | 7% |
| Glycerol | 17% | 10% | 20% |
| Ethylene Glycol | 7% | 5% | 5% |
| Surfynol 440 | 0.75% | 1.0% | 1.0% |
| Water (to 100%) | Balance | Balance | Balance |
| Properties |  |  |  |
| Viscosity (cps) | 6.5 | 8.32 | 6.73 |
| OD | 1.34 | 1.28 | 1.28 |
| Jetting reliability rating | 3 | 2 | 2 |
| 3A wash rating | 4.0 | 2.5 | 3.5 |
| Dry crock | 2.5 | 2.0 | 4.0 |
| Wet crock | 1.5 | 2.0 | 2.0 |

Similarly, Inks 2A-2E were prepared using the polymeric dispersed black pigment dispersion, PUD Binder as the first binder, and a polyurethane as the second binder, and other ingredients listed in Table 2 below. The inks were printed on 419 cotton fabric, fused at 190° C. for 1 min. The jetting reliability rating, washfastness and crock properties for Inks 2A-2E are also listed in Table 2.

TABLE 2

|  | Ink 2A (Comparative) | Ink 2B | Ink 2C | Ink 3D | Ink 2E |
|---|---|---|---|---|---|
| Polymeric Dispersed K | 5% | 6% | 6% | 6% | 6% |
| Polyurethane 2 |  | 1% |  |  |  |
| Polyurethane 3 |  |  | 1% |  |  |
| Polyurethane 4 |  |  |  | 1% |  |
| Polyurethane 5 |  |  |  |  | 1% |
| PUD Binder | 8% | 10% | 10% | 10% | 10% |
| Glycerol | 17% | 18% | 18.5% | 18.5% | 18.5% |
| Ethylene Glycol | 12% | 7% | 7% | 7% | 7% |
| Surfynol 440 | 1.0% | 1.0% | 0.5% | 0.5% | 0.5% |
| Water (to 100%) | Balance | Balance | Balance | Balance | Balance |
| Properties |  |  |  |  |  |
| Viscosity (cps) | 7.59 | 7.69 | 7.32 | 7.15 | 7.32 |
| OD | 1.13 | 1.26 | 1.26 | 1.25 | 1.28 |
| Jetting reliability rating | 1 | 1 | 1 | 1 | 1 |
| 3A wash rating | 4.0 | 4.0 | 4.0 | 4.0 | 4.0 |
| Dry crock | 4.5 | 4.5 | 4.5 | 4.5 | 4.0 |
| Wet crock | 2.5 | 2.0 | 2.0 | 2.0 | 2.0 |

What is claimed is:

1. An ink-jet ink comprising an aqueous vehicle, a pigment, a first polymer and a second polymer; wherein said pigment is self-dispersed and the surface of said pigment is chemically modified with hydrophilic, dispersability-imparting groups, said first polymer is a crosslinked polyurethane and is dispersible in said aqueous vehicle, and said second polymer is an anionic polymer soluble in said aqueous vehicle and is one or more members selected from the group consisting of acrylic, hydrolyzed styrene maleic anhydride (SMA) and styrene acrylic acid polymer (SA), and wherein said crosslinked polyurethane is crosslinked to an extent of 4% or greater.

2. The ink of claim 1, wherein said second polymer is hydrolyzed styrene maleic anhydride (SMA).

3. The ink of claim 2, wherein said ink is printed on an offset media.

4. The ink of claim 2, wherein said ink is printed on textile.

5. The ink of claim 1, wherein said second polymer is acrylic.

6. The ink of claim 5, wherein said ink is printed on an offset media.

7. The ink of claim 5, wherein said ink is printed on textile.

8. The ink of claim 1, wherein said second polymer is styrene acrylic acid.

9. The ink of claim 8, wherein said ink is printed on an offset media.

10. The ink of claim 8, wherein said ink is printed on textile.

11. An ink-jet ink consisting of an aqueous vehicle, a pigment, a first polymer and a second polymer; wherein said pigment is self-dispersed and the surface of said pigment is chemically modified with hydrophilic, dispersability-imparting groups, said first polymer is a crosslinked polyurethane and is dispersible in said aqueous vehicle, and said second polymer is an anionic polymer soluble in said aqueous vehicle and is one or more members selected from the group consisting of acrylic, hydrolyzed styrene maleic anhydride (SMA) and styrene acrylic acid polymer (SA), and wherein said crosslinked polyurethane is crosslinked to an extent of 4% or greater.

* * * * *